UNITED STATES PATENT OFFICE.

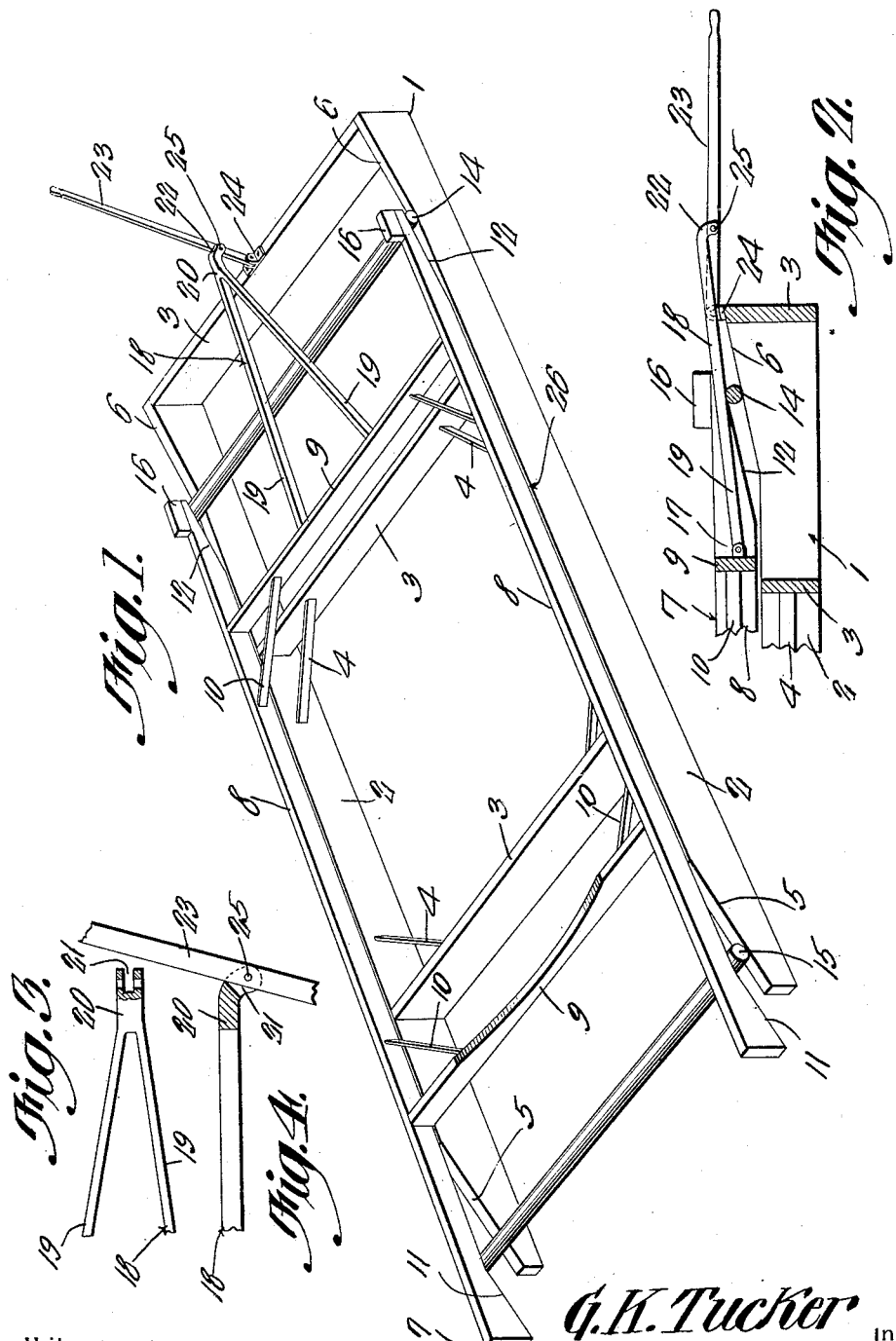

GEORGE K. TUCKER, OF HORACE, ILLINOIS.

INCLINE LIFTING-JACK.

1,109,089.  Specification of Letters Patent. Patented Sept. 1, 1914.

Application filed March 11, 1912. Serial No. 683,004.

*To all whom it may concern:*

Be it known that I, GEORGE K. TUCKER, a citizen of the United States, residing at Horace, in the county of Edgar and State of Illinois, have invented a new and useful Lifting-Jack, of which the following is a specification.

The device constituting the subject matter of this application is a lifting jack, adapted to be employed for elevating vehicles, to the end that the tires upon the vehicles may not be under pressure when the vehicle is not in use.

One object of the present invention is to provide a lifting jack including a movable member adapted to be elevated automatically by contact with the axle of a vehicle, locking means being provided which, acting automatically when the movable member is advanced, serve to hold the movable member in an elevated position.

Another object of the invention is to provide novel means whereby the rollers may be maintained between the frames.

The invention aims further, to increase the utility of devices of that type to which the present invention appertains.

In the drawings, Figure 1 shows the invention in perspective; Fig. 2 is a fragmental longitudinal section; Fig. 3 is a top plan of the link; and Fig. 4 is a side elevation of the link and the lever, a portion of the link being broken away.

In carrying out the invention there is provided a fixed frame, denoted generally by the numeral 1, the frame including side bars 2, connected by sills 3, there being braces 4 connecting sills 3 with the side bars 2. At the rear end of the fixed frame 1, the side bars 2 thereof are provided upon the upper edges with rearwardly and downwardly slanting surfaces 5. Adjacent the forward end of the frame 1, the side bars 2 thereof, are provided with forwardly and upwardly slanting surfaces 6.

The invention further includes a movable frame, denoted generally by the numeral 7, the frame 7 comprising side bars 8, connected by sills 9, there being braces 10 uniting the sills 9 with the side bars 8. Adjacent the rear end of the movable frame 7, the side bars 8 thereof are provided with downwardly and rearwardly slanting surfaces 11. Adjacent the forward edge of the movable frame 7, the side bars 8 thereof are provided with forwardly and upwardly inclined surfaces 12. A roller 14 is engaged between the surfaces 6 and 12 of the frames 1 and 7 respectively, and another roller 15 is engaged between the surfaces 5 and 11. The side bars 8 of the movable frame 7 are provided, adjacent their forward ends, with upstanding stopblocks 16.

Pivoted as indicated at 17 to one of the sills 9 of the frame 7 is a link denoted generally by the numeral 18, the link 18 comprising diverging parts 19, united to form a head 20, provided with a slot 21, the head 20 being downwardly curved as indicated at 22. A lever 23 is fulcrumed as indicated at 24 upon the end sill 3 of the frame 1. The lever 23 is received within the slot 21 of the head 20, and is pivoted thereto as indicated at 25.

In operation, the parts are positioned as shown in Fig. 1, and when an automobile or other vehicle is advanced over the frames 1 and 7, the forward axle of the vehicle will engage the stopblocks 16. The frame 7 will thereupon be advanced upon the frame 1 and when the frame 7 is advanced, the roller 15, coöperating with the inclined surfaces 5 and 11, and the roller 14, coöperating with the inclined surfaces 6 and 12, will effect a lifting of the frame 8, the vehicle being lifted at the same time, so that the tires upon the vehicle wheels are out of engagement with the ground. When the frame 7 is lifted and advanced in the manner hereinbefore set forth, the lever 23 will swing into the horizontal position indicated in Fig. 2, the lever 23 and the link 18 being knuckled together, so that the frame 7 and the vehicle which is supported thereby, cannot slide rearwardly. It is to be noted that when the lever 23 and the link 18 move into locked position, the roller 14, as shown in Fig. 2, engages the link 18 and acts as a stop, serving to hold the link 18 and the lever 23 in a locked relation. When it is desired to lower the vehicle wheels into engagement with the ground, the lever 23 is swung manually from the position indicated in Fig. 2, into that indicated in Fig. 1.

It is to be observed that the outer faces of the frames 1 and 7 are plain and unencumbered so as to permit the wheels of the vehicle to pass upon both sides of the frames, and to permit the axle of the vehicle to engage with the stopblock 16.

Noting Fig. 1, and comparing the same with Fig. 4, it will be observed that when the lever is in the position shown in Fig. 1, the lever will abut the forward edge of the head 20 of the link 18 (see Fig. 4). When the parts 23 and 18 are thus positioned, the frames 1 and 7 will be spaced apart slightly, as indicated there by the reference characters 26. Because the frames 1 and 8 are spaced apart, and are held in such relation, there will at all times be some pressure upon the rollers 14 and 15. Consequently, the rollers, and particularly the roller 15, will be prevented from rolling rearwardly, down the inclined surfaces of the frame 1, and along the side bars 2. The rollers, therefore, are at all times held in such positions as to exercise their lifting functions, when the axle of the vehicle comes into contact with the stopblock 16.

Having thus described the invention what is claimed is:—

A device of the class described comprising a fixed frame and a superposed movable frame, the frames having mutually inclined surfaces; rollers engaged between the mutually inclined surfaces of the frames; a vehicle engaging stop member on the movable frame; a lever fulcrumed on one end of the fixed frame; and a link pivoted to the end of the movable frame and to the lever, the link and the lever being adapted to knuckle into interlocked relation, and one roller being engageable by the link to bind the roller against movement.

In testimony that I claim the foregoing as my own, I have hereto affixed my signature in the presence of two witnesses.

GEORGE K. TUCKER.

Witnesses:
J. M. RHOADS,
C. H. LAUGHLIN.

Copies of this patent may be obtained for five cents each, by addressing the "Commissioner of Patents, Washington, D. C."